(12) United States Patent  
Hayes

(10) Patent No.: US 12,240,710 B2
(45) Date of Patent: Mar. 4, 2025

(54) APPARATUS AND METHOD FOR HANDLING PORTABLE TRAFFIC DELINEATORS

(71) Applicant: Bryan L Hayes, Hastings, NE (US)

(72) Inventor: Bryan L Hayes, Hastings, NE (US)

( * ) Notice: Subject to any disclaimer, the term of this patent is extended or adjusted under 35 U.S.C. 154(b) by 509 days.

(21) Appl. No.: 17/538,964

(22) Filed: Nov. 30, 2021

(65) Prior Publication Data

US 2022/0169455 A1    Jun. 2, 2022

Related U.S. Application Data

(60) Provisional application No. 63/119,587, filed on Nov. 30, 2020.

(51) Int. Cl.
  *B66C 1/42* (2006.01)
  *B65G 47/91* (2006.01)
  *B66C 1/62* (2006.01)
  *E01F 9/70* (2016.01)

(52) U.S. Cl.
  CPC ............... *B65G 47/91* (2013.01); *B66C 1/427* (2013.01); *B66C 1/62* (2013.01); *E01F 9/70* (2016.02)

(58) Field of Classification Search
  CPC ........... B65G 47/91; B66C 1/625; B66C 1/42; B65F 3/04; B65F 3/043; B65F 3/041; E01F 9/70
  See application file for complete search history.

(56) References Cited

U.S. PATENT DOCUMENTS

| | | |
|---|---|---|
| 3,165,348 A | 1/1965 | Keskitalo |
| 3,732,997 A * | 5/1973 | Reavis ..................... B65F 1/02 414/424 |
| 3,750,900 A | 8/1973 | Piercey |
| 3,765,554 A | 10/1973 | Morrison |
| 3,796,331 A | 3/1974 | Dutton |
| 4,597,706 A | 7/1986 | Michit |
| 4,669,940 A | 6/1987 | Englehardt et al. |
| 5,026,204 A | 6/1991 | Kulp et al. |
| 5,244,334 A * | 9/1993 | Akita ..................... E01F 9/70 414/501 |
| 5,525,021 A | 6/1996 | Larguier |

(Continued)

*Primary Examiner* — Kaitlin S Joerger
(74) *Attorney, Agent, or Firm* — Jeffrey L. Thompson; Thompson Law, P.a.

(57) ABSTRACT

An apparatus and method for handling portable traffic delineators includes a lifting arm assembly and a gripper assembly arranged to move portable traffic delineators between a cargo platform on a vehicle and a road surface. The gripper assembly has guide rails that define a V-shaped receiving structure with rollers to guide and center the portable traffic delineators within the V-shaped receiving structure. The gripper assembly also has suction cups arranged to pivot into and out of the V-shaped receiving structure for applying a suction force to the outer surface of the portable traffic delineators received in the V-shaped receiving structure. A programmable controller is used to perform a sequence of movements of the lifting arm assembly and the gripper assembly to either retrieve portable traffic delineators from a roadway or place portable traffic delineators on the roadway when the portable traffic delineators are detected within the V-shaped receiving structure.

13 Claims, 18 Drawing Sheets

(56) References Cited

U.S. PATENT DOCUMENTS

| | | | | |
|---|---|---|---|---|
| 5,711,565 A | * | 1/1998 | Smith | B65F 3/041 |
| | | | | 294/902 |
| 5,791,861 A | * | 8/1998 | Seelig | B65G 47/91 |
| | | | | 294/185 |
| 6,056,498 A | | 5/2000 | Velinsky et al. | |
| 6,158,948 A | * | 12/2000 | Calvert | B60P 9/00 |
| | | | | 414/547 |
| 6,752,582 B2 | | 6/2004 | Garcia | |
| 8,142,130 B2 | | 3/2012 | Garcia | |
| 8,979,465 B2 | | 3/2015 | Brown | |
| 9,056,572 B2 | | 6/2015 | Hemphill et al. | |
| 9,834,377 B1 | * | 12/2017 | Hayes | B65F 3/041 |
| 2006/0147264 A1 | | 7/2006 | Doran, Jr. | |
| 2007/0071584 A1 | * | 3/2007 | Beckstead | E01F 9/70 |
| | | | | 414/467 |
| 2014/0308102 A1 | * | 10/2014 | Betson | E01F 9/70 |
| | | | | 414/503 |
| 2016/0325945 A1 | * | 11/2016 | Berger | C01B 33/035 |
| 2016/0355387 A1 | * | 12/2016 | Ruby | E01F 9/70 |
| 2018/0134487 A1 | * | 5/2018 | McNeilus | B65F 3/041 |
| 2018/0195246 A1 | * | 7/2018 | Hanssen | G08B 5/006 |
| 2020/0131725 A1 | * | 4/2020 | Hung | G06V 20/588 |
| 2020/0377344 A1 | * | 12/2020 | La Ferla | B66C 13/40 |
| 2021/0277613 A1 | * | 9/2021 | Hendricks, Sr. | B60P 1/5433 |
| 2022/0169455 A1 | * | 6/2022 | Hayes | E01F 9/70 |
| 2022/0349132 A1 | * | 11/2022 | Hendricks, Sr. | B25J 9/1679 |
| 2023/0304237 A1 | * | 9/2023 | Rigby | E01F 9/70 |
| 2023/0348232 A1 | * | 11/2023 | Vehmeijer | B66C 1/108 |
| 2024/0217734 A1 | * | 7/2024 | Wente | B65F 3/041 |

\* cited by examiner

APPARATUS AND METHOD FOR HANDLING PORTABLE TRAFFIC DELINEATORS

BACKGROUND OF THE INVENTION

Field of the Invention

The present invention is generally related to material handling devices, and in particular, to an apparatus and method for handling portable traffic delineators.

Description of the Related Art

As used in this application, portable traffic delineators include structures, such as traffic lane delineator cones and barrels, that can be placed in roadways to provide traffic control for construction zones, lane closures, work sites, and the like. Portable traffic delineators may be covered with fluorescent coatings or reflective markings to enhance visibility. Portable traffic delineators are movable from one location to another on a vehicle, such as a flatbed truck or trailer, and are typically manually unloaded from the vehicle and placed in the roadway to set up a traffic control situation, and manually removed from the roadway and loaded back onto a vehicle at the end of the traffic control situation.

The unloading and loading of portable traffic delineators is usually done by a crew of workers, including a driver, a person stacking and removing the delineators on the vehicle, and often a person walking along beside the vehicle to place the delineators on the roadway and/or to remove them from the roadway for loading back onto the vehicle. The manpower required for these operations is a significant expense as well as a safety risk due to the proximity of and exposure to traffic.

A need exists for automating the handling of portable traffic delineators to enhance safety and improve operating efficiencies for setting up and removing traffic control situations.

SUMMARY OF THE INVENTION

An object of the present invention is to provide an apparatus and method for unloading and loading portable traffic delineators using a mechanical arm and gripper assembly that reduces manpower and enhances safety and efficiency.

To accomplish these and other objects of the invention, an apparatus is provided for handling portable traffic delineators that includes a lifting arm assembly and a gripper assembly arranged to move portable traffic delineators between a cargo platform on a vehicle and a road surface. The gripper assembly has guide rails that define a V-shaped receiving structure with rollers to guide and center the portable traffic delineators within the V-shaped receiving structure. The gripper assembly also has suction cups arranged to pivot into and out of the V-shaped receiving structure for applying a suction force to the outer surface of the portable traffic delineators received in the V-shaped receiving structure. A programmable controller is used to perform a sequence of movements of the lifting arm assembly and the gripper assembly to either retrieve portable traffic delineators from a roadway or place portable traffic delineators on the roadway when the portable traffic delineators are detected within the V-shaped receiving structure.

According to one aspect of the invention, an apparatus for handling portable traffic delineators is provided, comprising: a lifting arm assembly; and a gripper assembly mounted to the lifting arm assembly for interfacing with portable traffic delineators to move the traffic delineators between a vehicle platform and a road surface. The gripper assembly comprises guide rails defining a V-shaped receiving structure for receiving portable traffic delineators, and at least one suction cup arranged for pivoting into and out of engagement with an outer surface of a portable traffic delineator received in the V-shaped receiving structure. The suction cup is connected to a vacuum source for applying a suction force to the outer surface of the portable traffic delineator received in the V-shaped receiving structure to allow the portable traffic delineator to be lifted and moved between the vehicle platform and the road surface.

According to another aspect of the invention, an apparatus for handling portable traffic delineators is provided, comprising: a frame adapted to be secured to a vehicle; a carriage mounted to the frame, the carriage being movable from one side of the frame to another side of the frame to configure the apparatus for right side or left side operation relative to the vehicle on which the frame is secured; a lifting arm assembly; and a gripper assembly. The lifting arm assembly has a support tower connected to the carriage for rotation about a first vertical axis relative to the carriage, and an arm connected to the support tower for movement vertically relative to the carriage. The gripper assembly is pivotally mounted to the arm for rotation about a second vertical axis. The gripper assembly comprises guide rails that define a V-shaped receiving structure for receiving portable traffic delineators, and at least one suction cup arranged for pivoting into and out of engagement with an outer surface of a portable traffic delineator received in the V-shaped receiving structure. The suction cup is connected to a vacuum source for applying a suction force to the outer surface of the portable traffic delineator received in the V-shaped receiving structure. A switch is arranged to detect a presence of a portable traffic delineator within the V-shaped receiving structure.

According to another aspect of the invention, a method of handling portable traffic delineators is provided, comprising: providing a lifting arm assembly and a gripper assembly mounted to the lifting arm assembly for interfacing with portable traffic delineators; detecting a presence of a portable traffic delineator within the gripper assembly; and controlling the lifting arm assembly and the gripper assembly to retrieve portable traffic delineators from a roadway or to place portable traffic delineators on a roadway when a presence of a portable traffic delineator is detected within the gripper assembly.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

An apparatus 10 for handling portable traffic delineators 11 according to the present invention will now be described in detail with reference to FIGS. 1 to 18 of the accompanying drawings.

Figure 1:
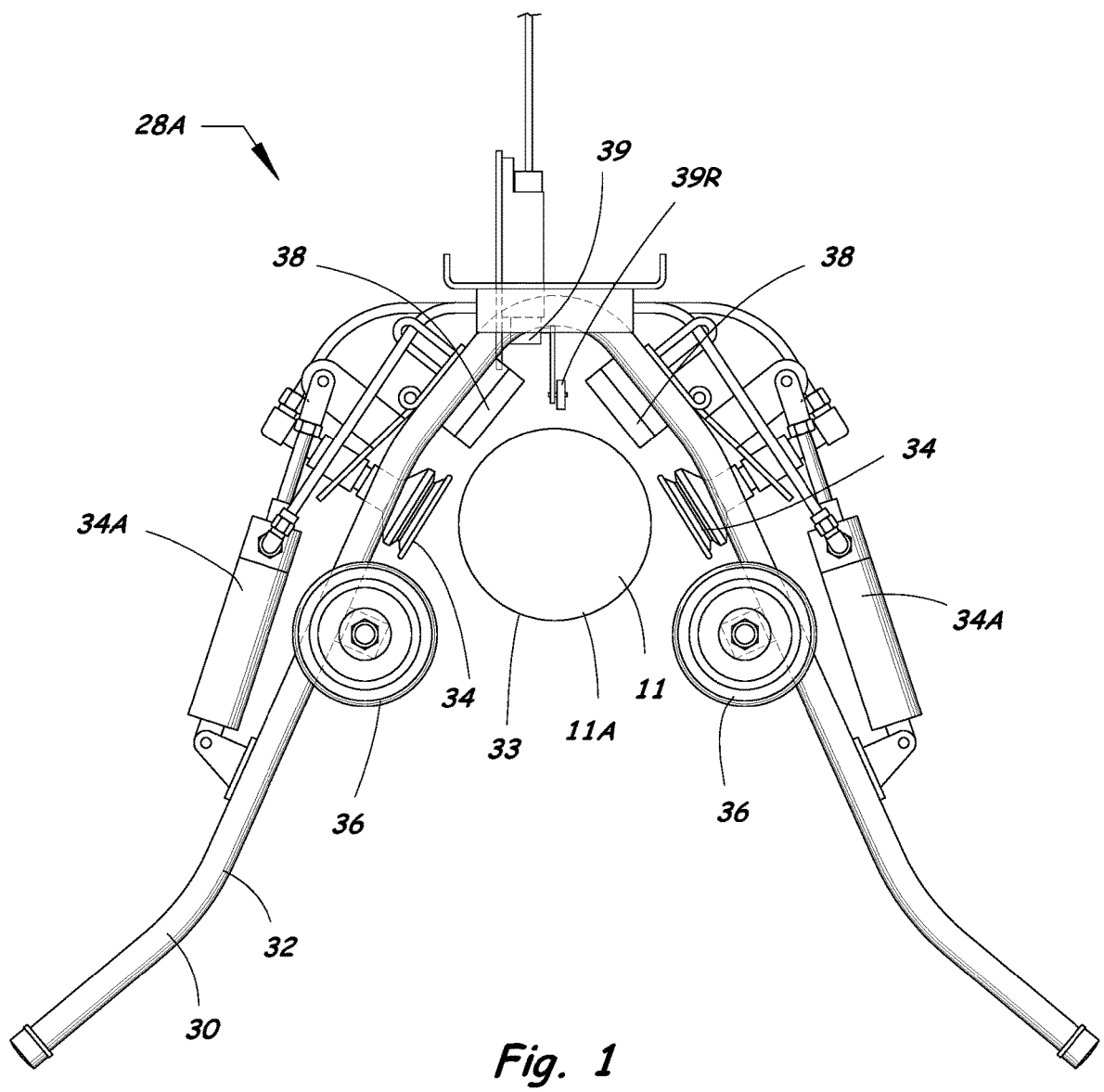
FIG. 1 is a plan view of a gripper assembly in an open configuration for use in an apparatus for handling cone-shaped portable traffic delineators according to a first embodiment of the present invention.
Figure 2:
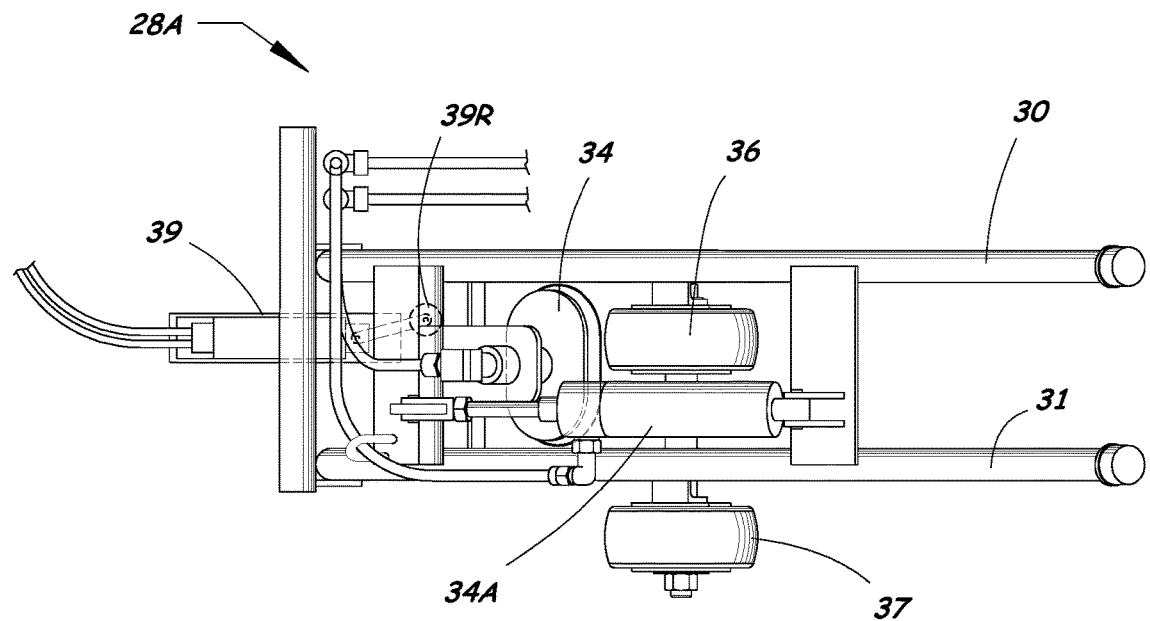
FIG. 2 is a side elevation view of the gripper assembly shown in FIG. 1.
Figure 3:
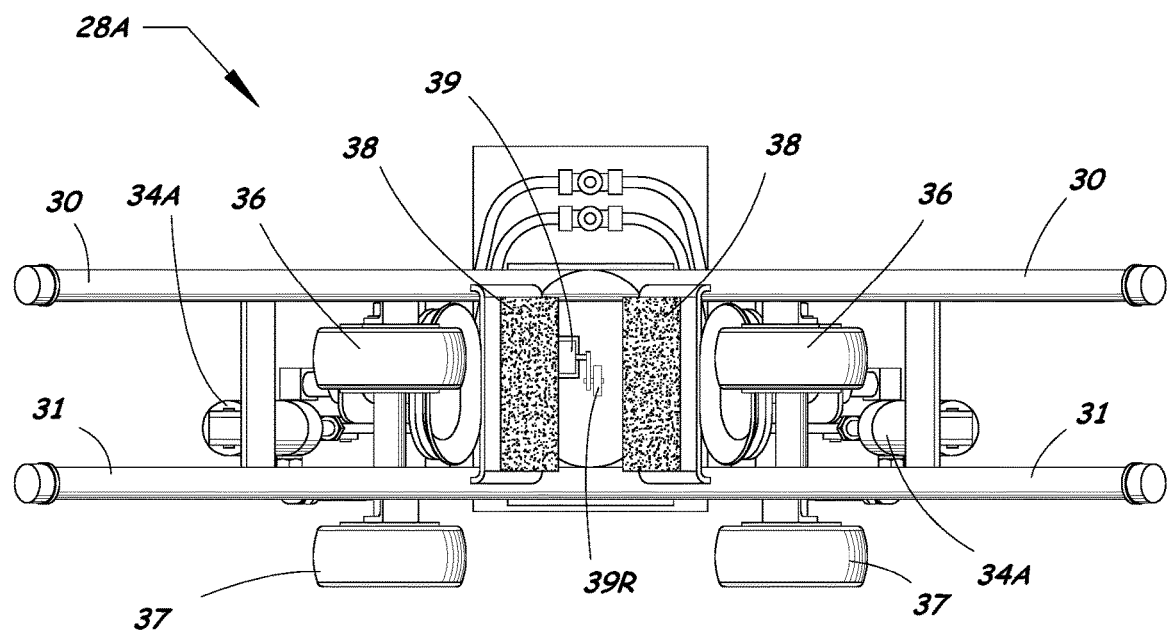
FIG. 3 is a front elevation view of the gripper assembly shown in FIG. 1.
Figure 4:
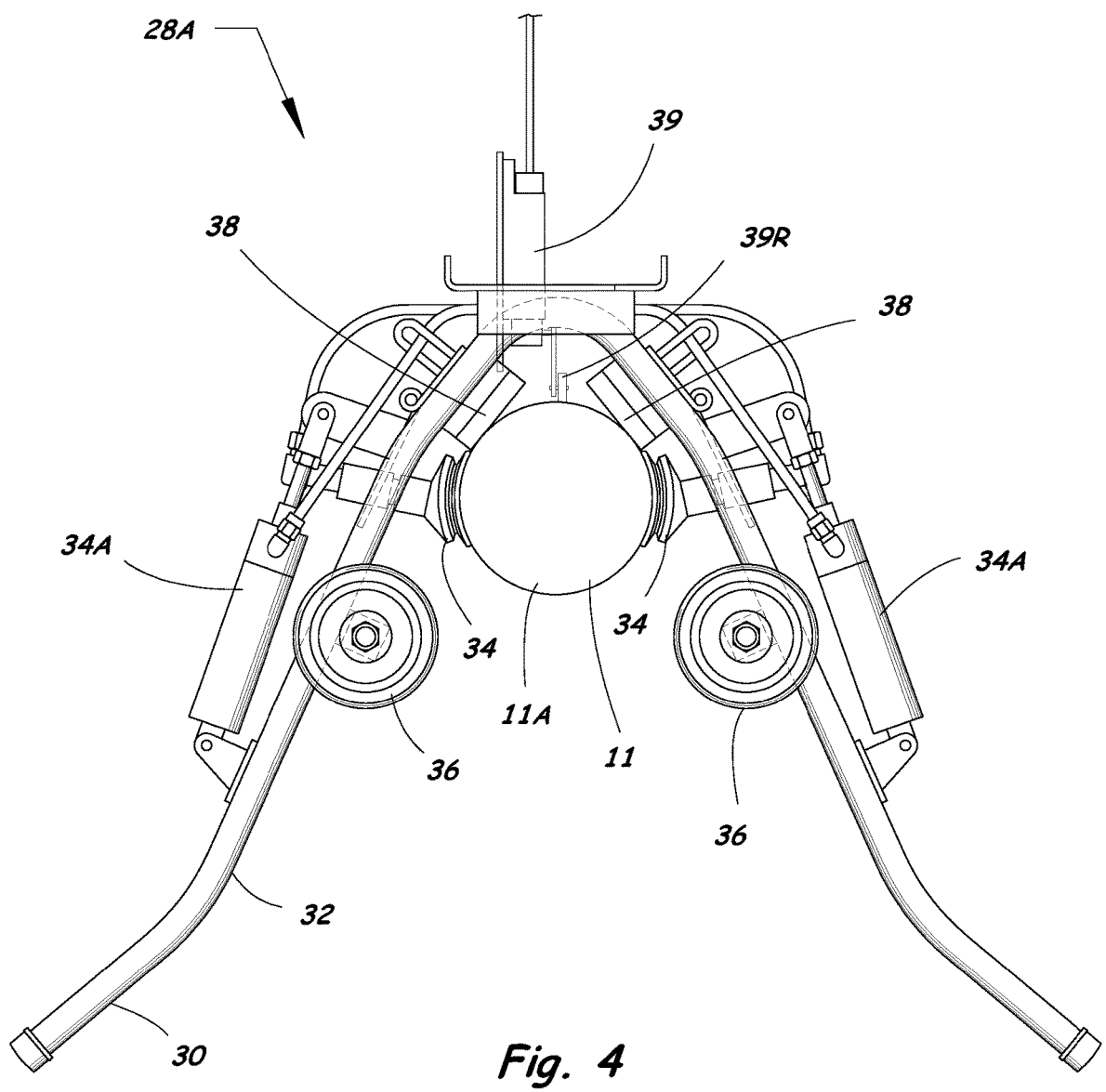
FIG. 4 is a plan view of the gripper assembly shown in FIG. 1 in a closed configuration for engaging and applying a suction force to an outer surface of a cone-shaped portable traffic delineator.
Figure 5:
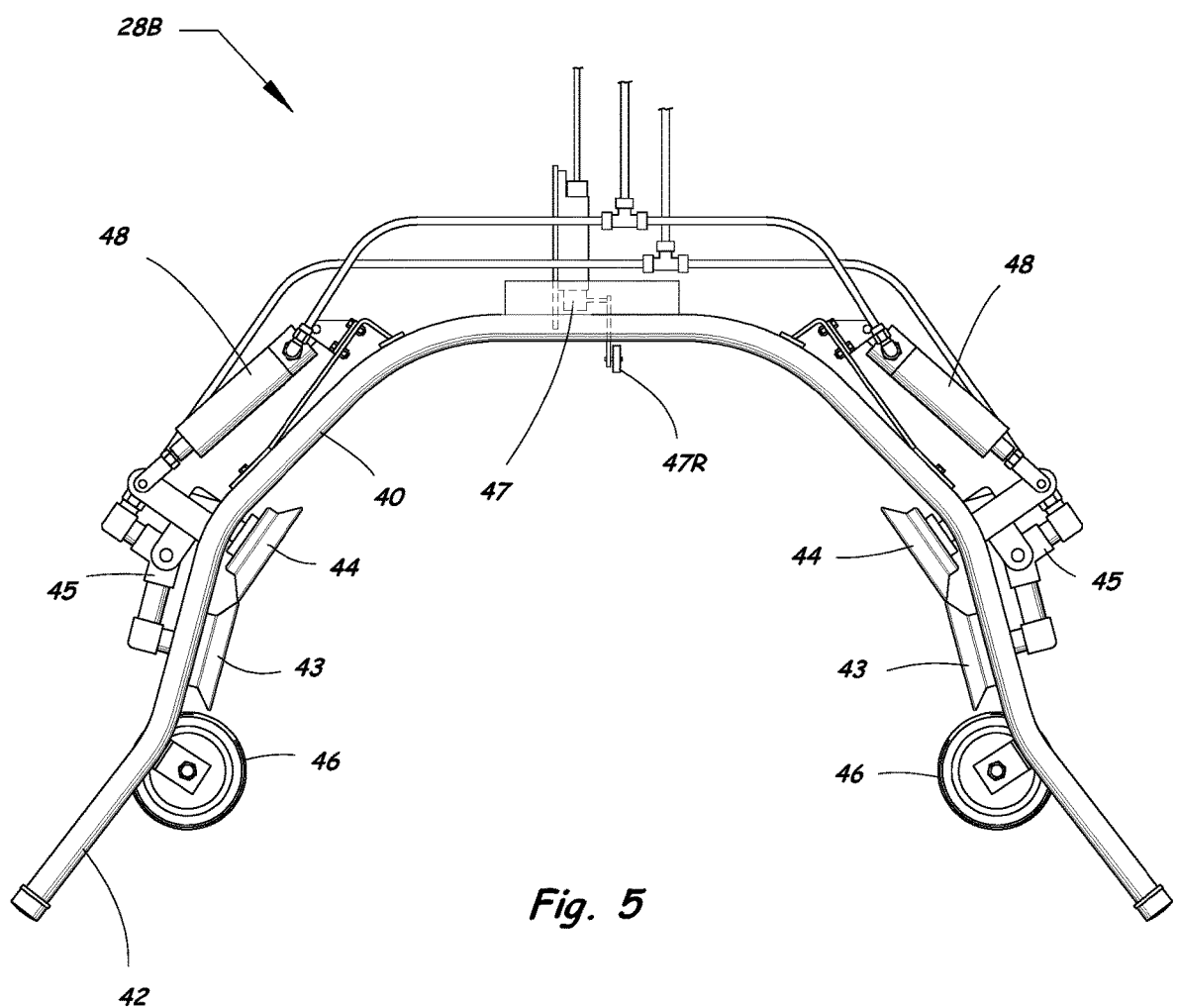
FIG. 5 is a plan view of a gripper assembly in an open configuration for use in an apparatus for handling barrel-shaped portable traffic delineators according to a second embodiment of the present invention.
Figure 6:
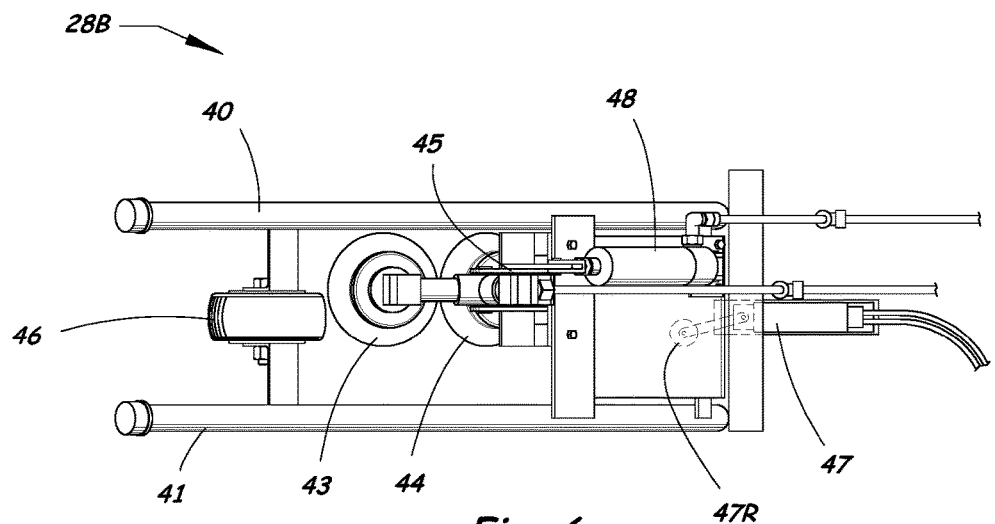
FIG. 6 is a side elevation view of the gripper assembly shown in FIG. 5.
Figure 7:
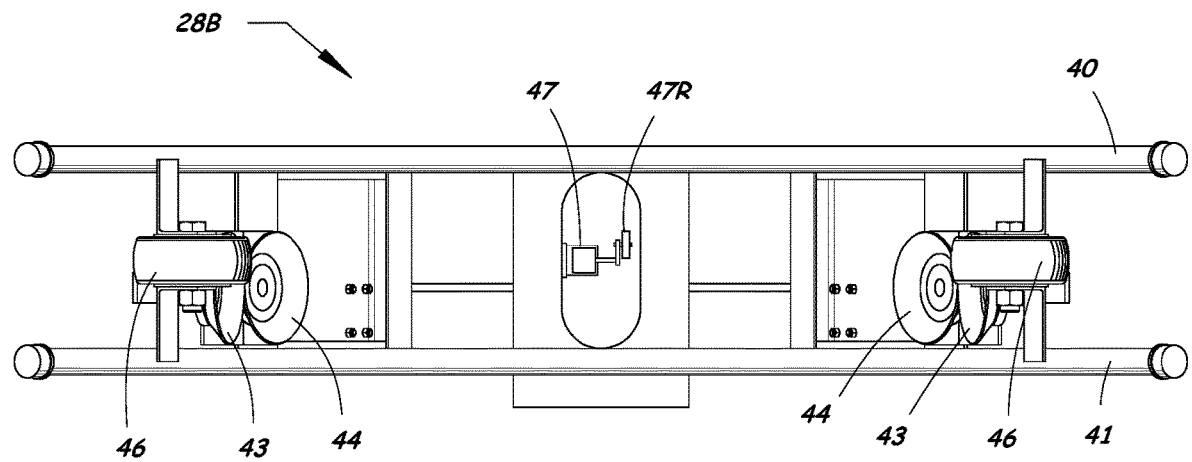
FIG. 7 is a front elevation view of the gripper assembly shown in FIG. 5.
Figure 8:
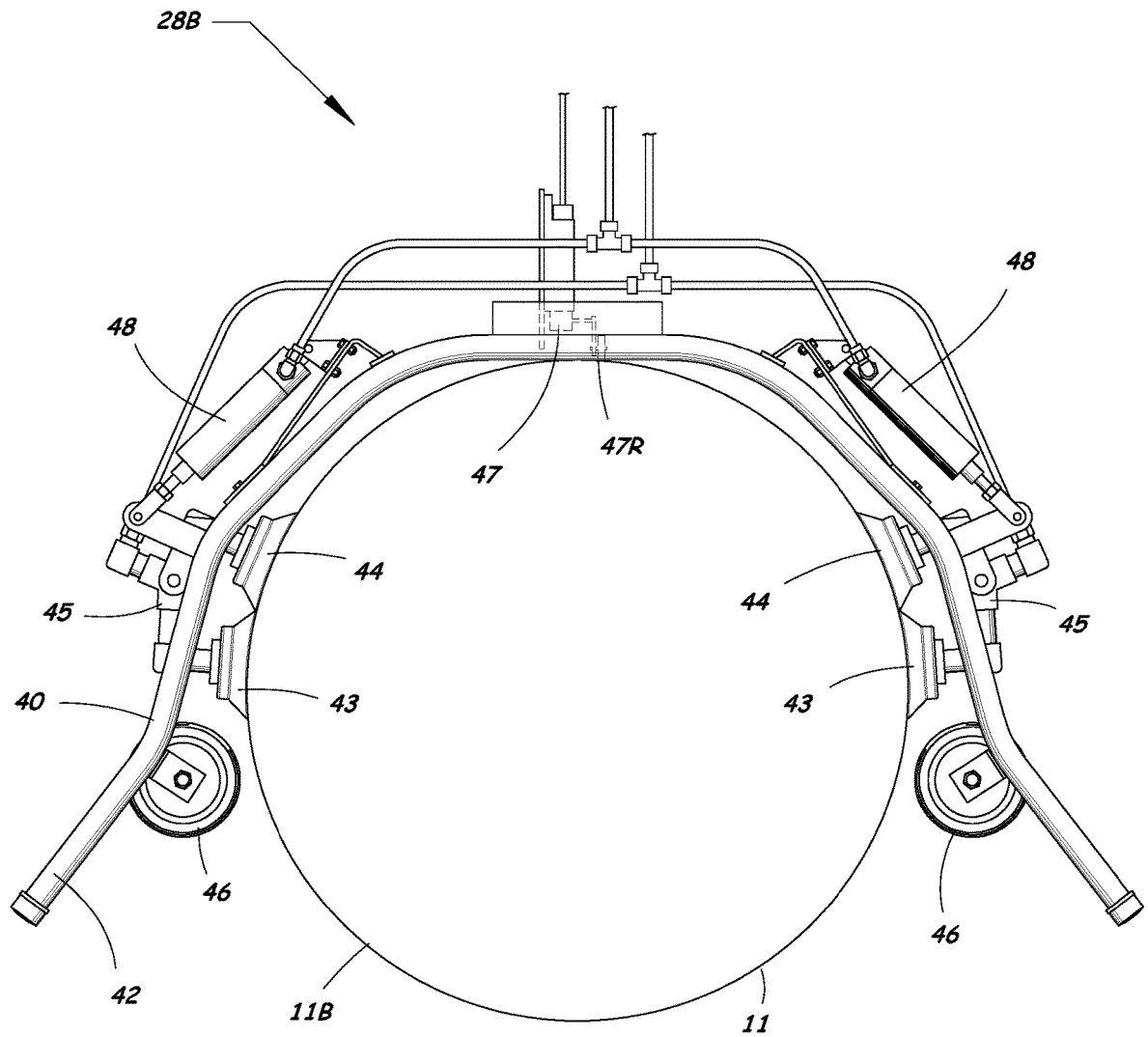
FIG. 8 is a plan view of the gripper assembly shown in FIG. 5 in a closed configuration for engaging and applying a suction force to an outer surface of a barrel-shaped portable traffic delineator.
Figure 9:
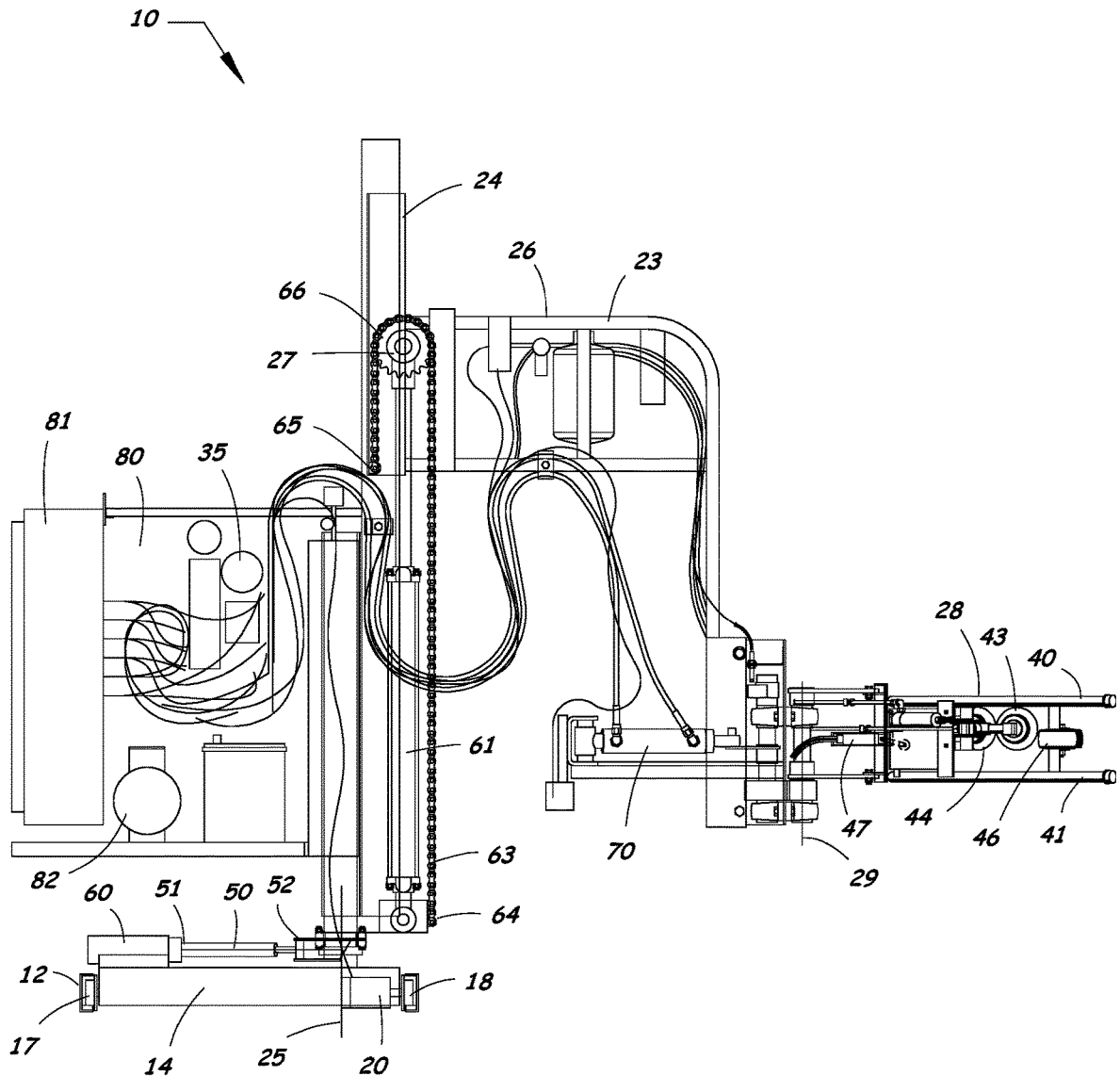
FIG. 9 is a side elevation view of an apparatus for handling portable traffic delineators according to the present invention.
Figure 10:
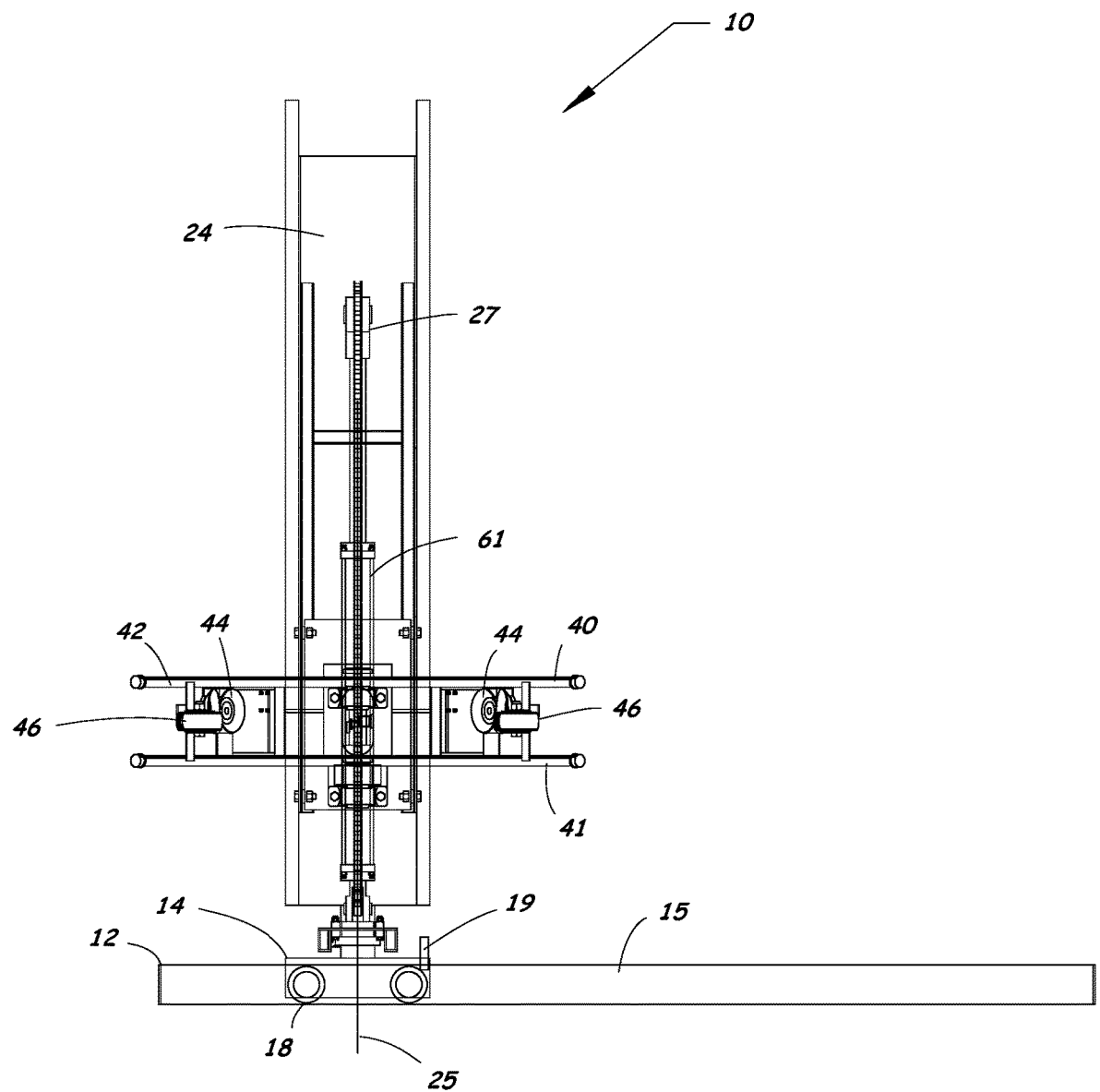
FIG. 10 is a front elevation view of the apparatus shown in FIG. 9.
Figure 11:
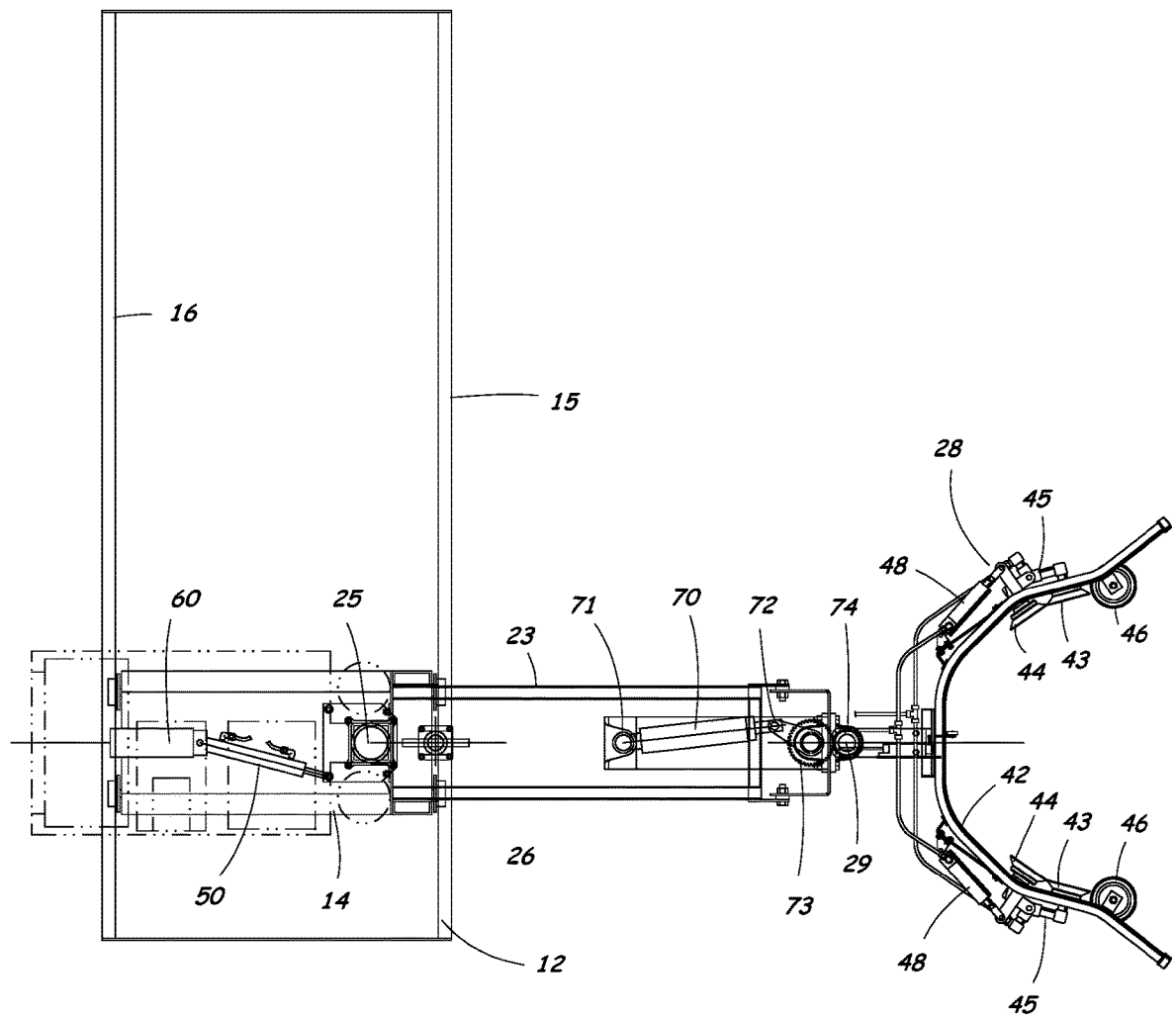
FIG. 11 is a top plan view of the apparatus shown in FIG. 9.
Figure 12:
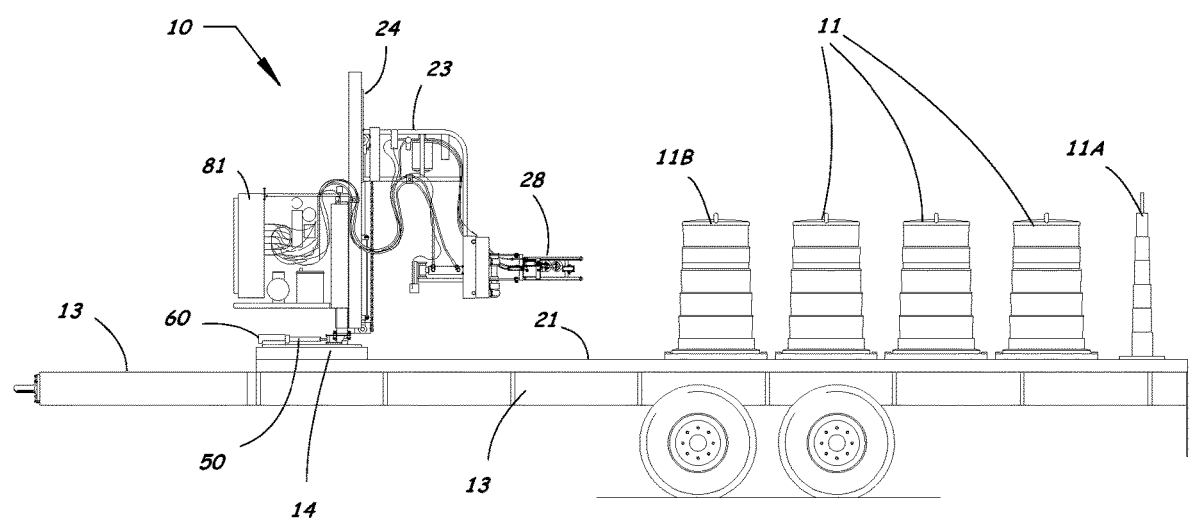
FIG. 12 is a side elevation view of the apparatus shown in FIG. 9 mounted on a flatbed trailer for transporting portable traffic delineators.
Figure 13:
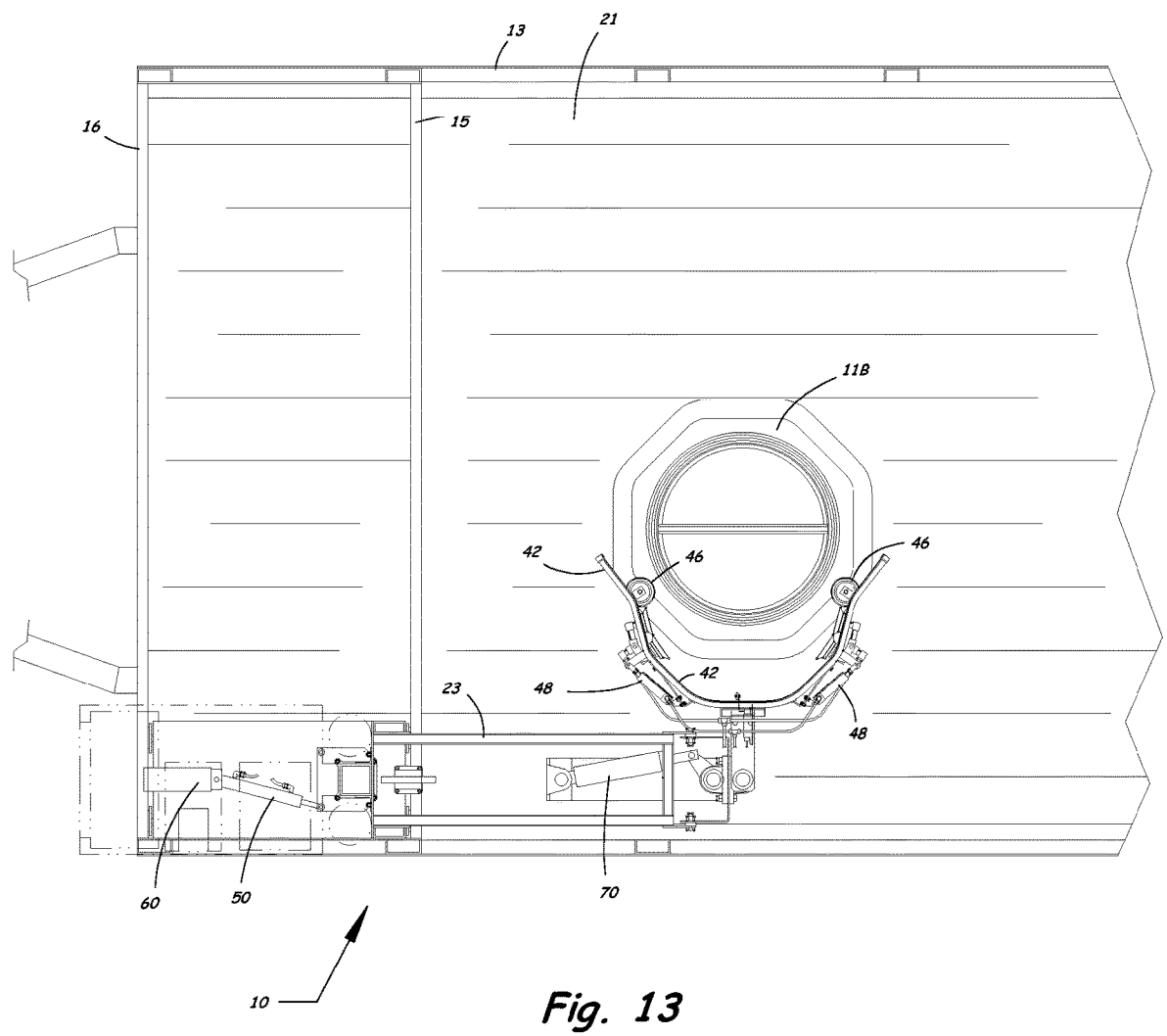
FIG. 13 is a top plan view of the apparatus with the gripper assembly positioned to receive a portable traffic delineator located on the trailer bed.
Figure 14:
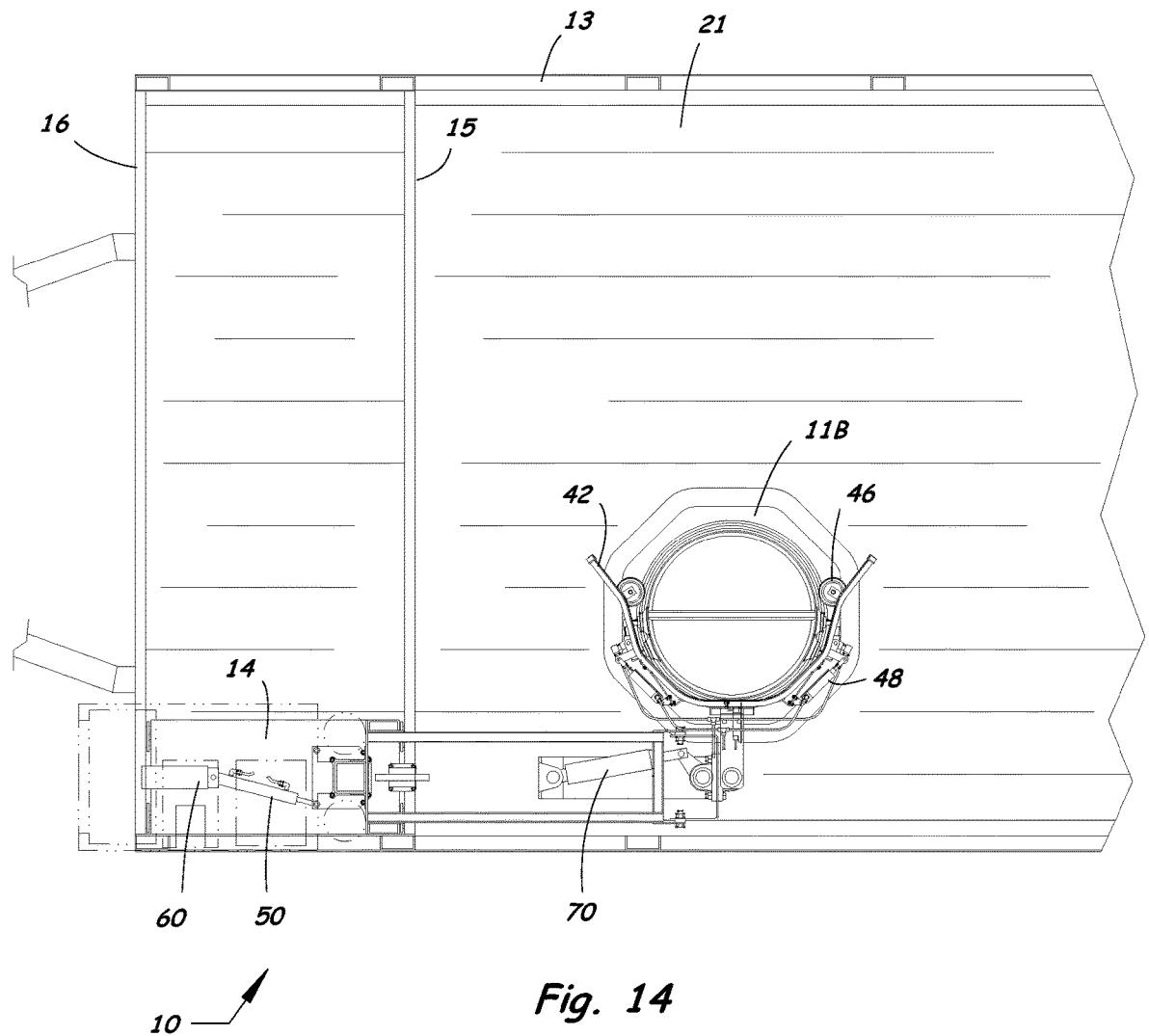
FIG. 14 is a top plan view of the apparatus with the gripper assembly in its closed configuration for engaging and applying a suction force to an outer surface of the portable traffic delineator for lifting and manipulating the delineator.
Figure 15:
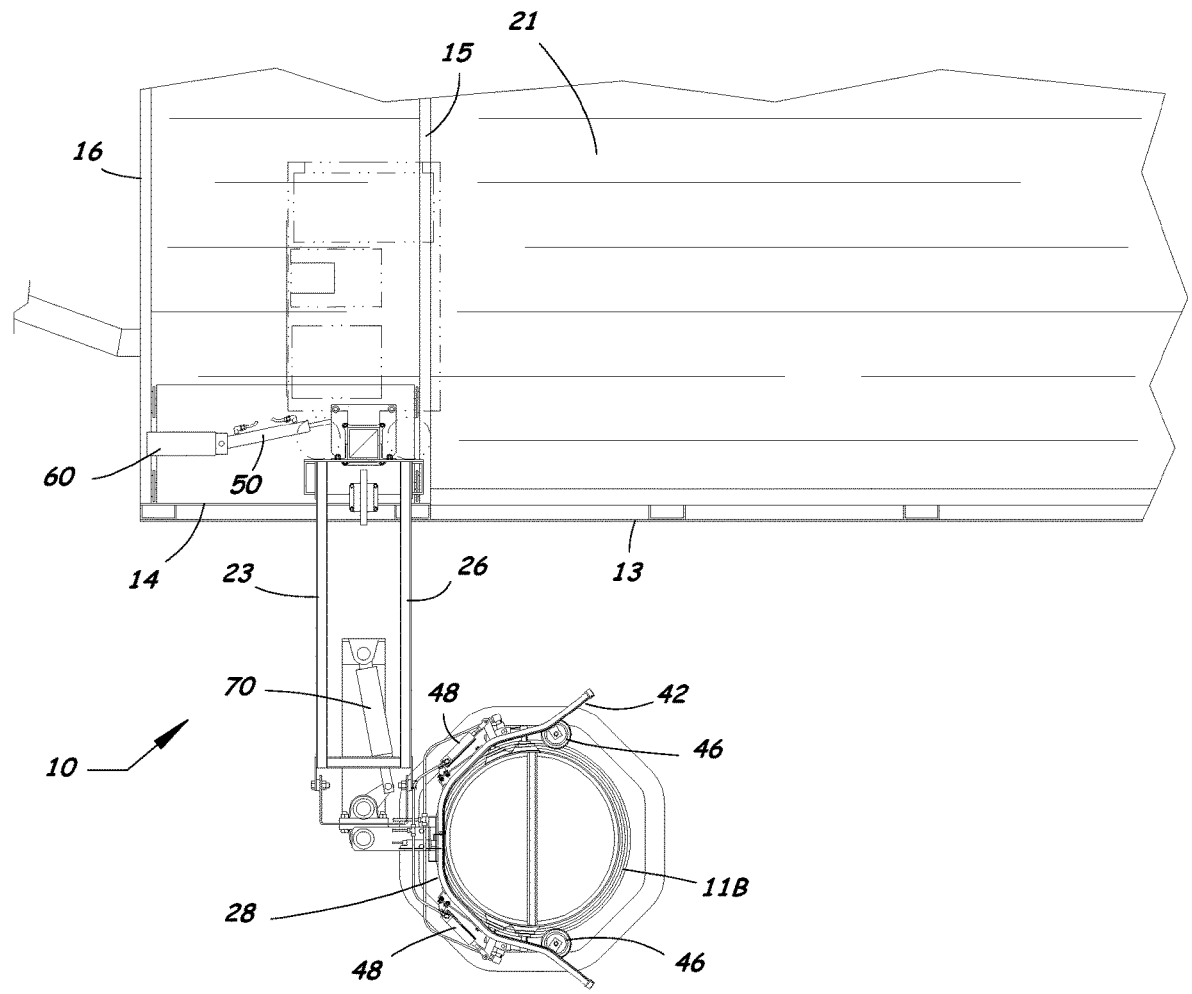
FIG. 15 is a top plan view of the apparatus with the lifting arm assembly rotated to extend outwardly from the trailer to place the portable traffic delineator on the left side of the trailer.
Figure 16:
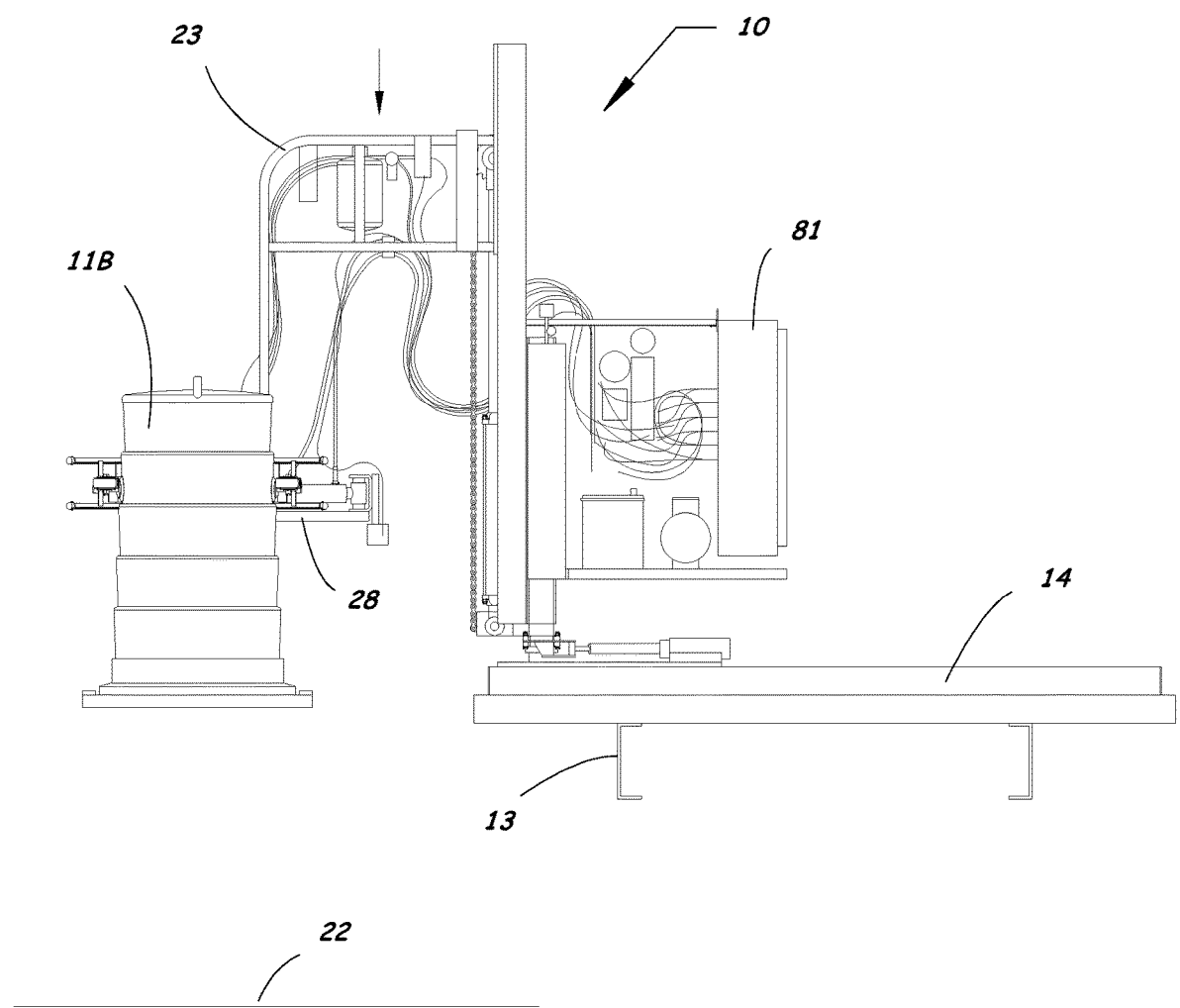
FIG. 16 is a rear elevation view of the apparatus with the lifting arm assembly in the position shown in FIG. 15.
Figure 17:
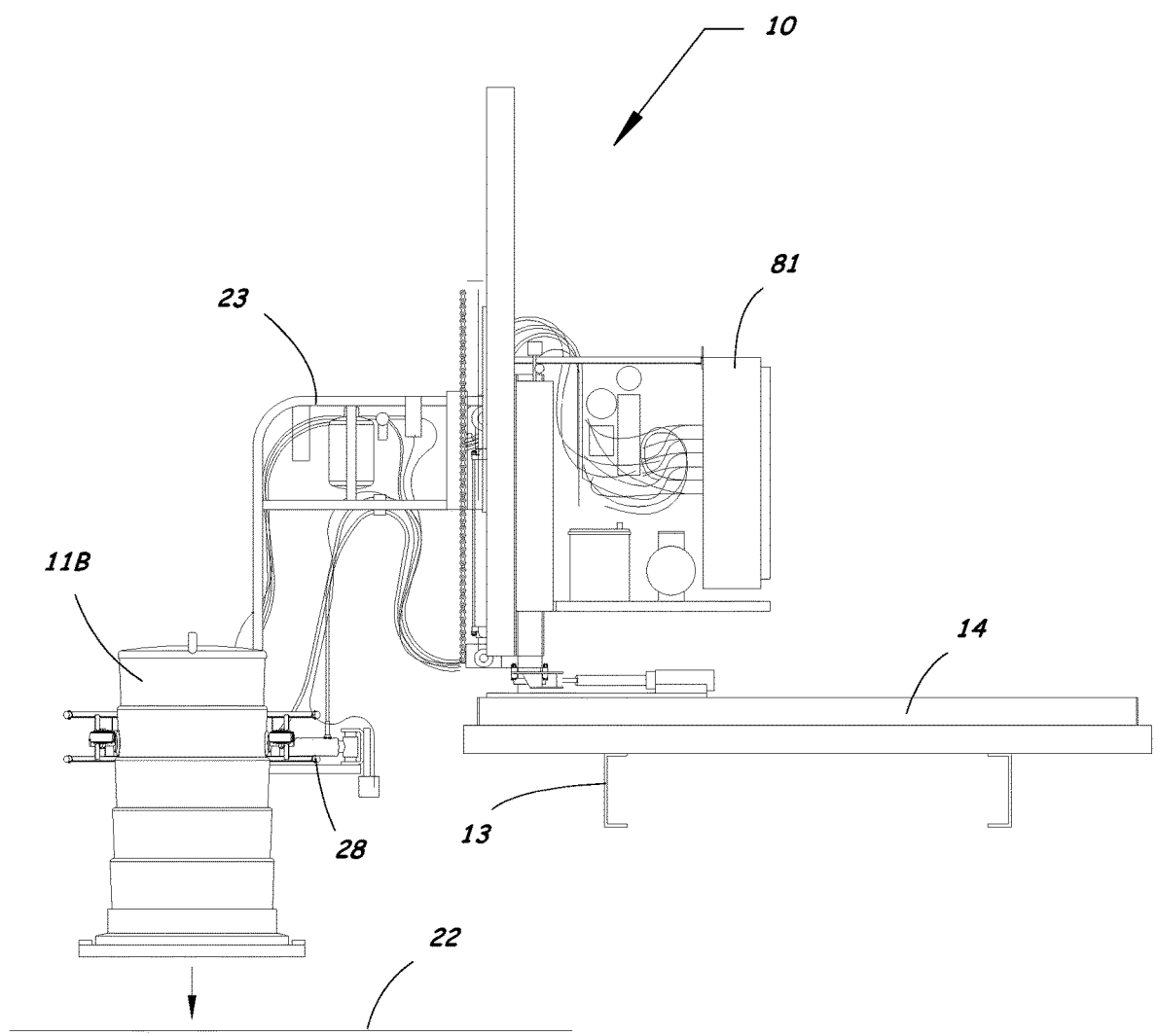
FIG. 17 is a rear elevation view of the apparatus shown in FIG. 16 with the lifting arm assembly being lowered toward the ground.
Figure 18:
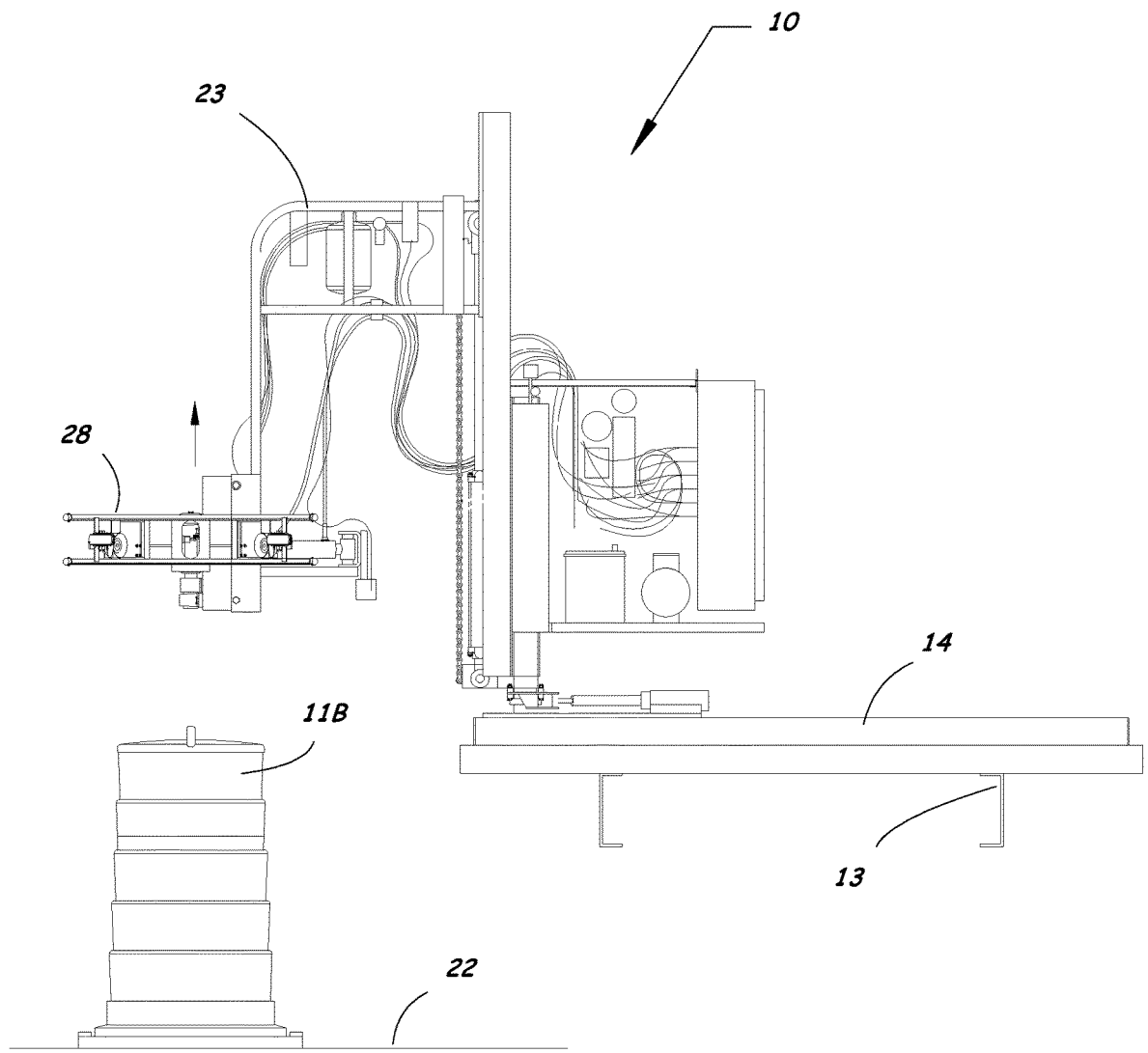
FIG. 18 is a rear elevation view of the apparatus shown in FIG. 17 after the gripper assembly disengages from the portable traffic delineator, and the lifting arm assembly is being raised in preparation for receiving another portable traffic delineator from the trailer.

The handling apparatus 10 includes a frame 12 adapted to be secured to a vehicle 13, such as a flatbed trailer (as shown in FIG. 12) or a flatbed truck or the like. A carriage 14 is mounted to the frame 12. The carriage 14 is movable from one side 12A of the frame 12 to another side 12B of the frame 12 to allow the apparatus 10 to be configured for right side or left side operation relative to the vehicle 13 on which the frame 12 is mounted.

In the illustrated embodiment, the frame 12 has first and second tracks 15, 16 that extend laterally of the vehicle 13. The carriage 14 has a plurality of rollers 17, 18 that fit into the tracks 15, 16 to allow the carriage 14 to be rolled from one side 12A of the vehicle 13 to the other side 12B of the vehicle 13. The carriage 14 can be manually moved along the tracks 15, 16 to a desired operating location. A lock assembly 19 can be used to secure the carriage 14 in the desired operating location.

Alternatively, a drive motor 20 can be provided to drive one or more of the rollers 18, or a separate drive wheel, to allow an operator to move the carriage 14 along the tracks 15, 16 in a selected direction. For example, the drive motor 20 can be used to move the carriage 14 from one side 12A of the vehicle 13 to the other side 12B of the vehicle 13 to configure the apparatus 10 for right side or left side operation. The drive motor 20 can also be used for fine adjustments to move the carriage 14 laterally on the vehicle 13 to place the traffic delineators 11 at desired locations on the vehicle cargo area 21 or on the roadway 22, and to align the apparatus 10 with traffic delineators 11 being retrieved.

A lifting arm assembly 23 having a support tower 24 is connected to the carriage 14 for rotation about a first vertical axis 25 relative to the carriage 14. The lifting arm assembly 23 has an arm 26 connected to the support tower 24 for movement vertically relative to the carriage 14. A vertical movement mechanism 27 is arranged to move the arm 26 vertically relative to the carriage 14.

A gripper assembly 28 is pivotally mounted to the arm 26 for rotation about a second vertical axis 29 and is configured to interface with the traffic delineators 11. Two embodiments of the gripper assembly 28 are illustrated in the drawings. FIGS. 1 to 4 illustrate a gripper assembly 28A for use with cone-shaped or narrow diameter portable traffic delineators 11A. FIGS. 5 to 8 illustrate a gripper assembly 28B for use with barrel-shaped or wide diameter portable traffic delineators 11B.

As shown in FIGS. 1 to 4, the gripper assembly 28A in the first embodiment has upper and lower guide rails 30, 31 that define a V-shaped receiving structure 32 (as viewed in plan view) for receiving portable traffic delineators 11A in an upright position. The upper and lower guide rails 30, 31 in the illustrated embodiment are mirror images of each other with approximately the same dimensions and curvatures to accommodate traffic delineators 11A having a generally cylindrical upper portion 33 engaged by the gripper assembly 28A. If traffic delineators 11A having angled sidewalls are to be engaged by the gripper assembly 28A, the lower guide rail 31 can be provided with a greater radius of curvature than the upper guide rail 30 to better correspond with the shape of the traffic delineators 11A.

At least one, and preferably a pair, of suction cups 34 are arranged on opposing sides of the V-shaped receiving structure 32 for pivoting movement into and out of engagement with an outer surface of the portable traffic delineator 11A received in the V-shaped receiving structure 32. Actuators 34A with spring returns are provided to move the suction cups 34 into and out of engagement with the traffic delineators 11A. The suction cups 34 are connected to a vacuum source 35 for applying a suction force to the outer surface of the portable traffic delineator 11A received in the V-shaped receiving structure 32. The suction cups 34 can have an oval shape with a longer dimension in the vertical direction to accommodate a traffic delineator 11A with a relatively small radius while increasing the surface area and the resulting lifting force that can be applied to the traffic delineators 11A by the suction cups 34.

At least one pair of rollers 36, and preferably two pairs of rollers 36, 37, are arranged at an intermediate location along the guide rails 30, 31 to facilitate guiding and centering a portable traffic delineator 11A within the V-shaped receiving structure 32. The two pairs of rollers 36, 37 in the illustrated embodiment include an upper pair of rollers 36 and a lower pair of rollers 37 for engaging the outer surface of the traffic delineators 11A as the traffic delineators 11A move relative to the V-shaped receiving structure 32 of the gripper assembly 28A.

At least one, and preferably a pair, of padded friction elements 38 are arranged within the V-shaped receiving structure 32 for engaging the portable traffic delineator 11A received in the V-shaped receiving structure 32. The padded friction elements 38 provide additional points of contact between the gripper assembly 28A and the outer surface of the traffic delineators 11A to hold the traffic delineators 11A securely within the gripper assembly 28A.

A switch or sensor 39 is arranged in the V-shaped receiving structure 32 to detect a presence of a portable traffic delineator 11A within the V-shaped receiving structure 32. The switch 39 can be a contact switch arranged to extend into the V-shaped receiving structure 32 for engagement with the traffic delineator 11A received in the gripper assembly 28A. In the illustrated embodiment, the contact switch 39 includes a rolling contact element 39R arranged to be engaged by a traffic delineator 11A received in the V-shaped receiving structure 32. Other types of sensors, such as proximity sensors, can also be used to detect the presence of a traffic delineator 11A in the V-shaped receiving structure 32.

As shown in FIGS. 5 to 8, the gripper assembly 28B in the second embodiment has guide rails 40, 41 that define a relatively wide V-shaped receiving structure 42 (as viewed in plan view) for receiving barrel-shaped traffic delineators 11B in an upright position. At least one pair, and preferably two pairs, of suction cups 43, 44 are arranged for pivoting movement into and out of engagement with an outer surface of the portable traffic delineator 11B received in the V-shaped receiving structure 42. Actuators 48 with spring returns are provided to move the suction cups 43, 44 into and out of engagement with the traffic delineators 11B. The suction cups 43, 44 are connected to a vacuum source 35 for applying a suction force to the outer surface of the portable traffic delineator 11B received in the V-shaped receiving structure 42.

In the illustrated embodiment, a first pair of suction cups 43, 44 are arranged on one side of the gripper assembly 28B, and a second pair of suction cups 43, 44 are arranged on the other side of the gripper assembly 28B. Each pair of suction cups 43, 44 are carried by a linkage assembly 45 that moves both suction cups 43, 44 simultaneously into the V-shaped receiving structure 42 for engaging the traffic delineators 11B.

A pair of rollers 46 are arranged at an intermediate location along the guide rails 40, 41 to facilitate guiding and centering a portable traffic delineator 11B within the V-shaped receiving structure 42.

A switch or sensor 47 is arranged in the V-shaped receiving structure 42 to detect a presence of a portable traffic delineator 11B within the V-shaped receiving structure 42. The switch 47 can be a contact switch arranged to extend into the V-shaped receiving structure 42 for engagement with the traffic delineator 11B received in the gripper assembly 28B. In the illustrated embodiment, the contact switch 47 includes a rolling contact element 47R arranged to be engaged by a traffic delineator 11B received in the V-shaped receiving structure 42. Other types of sensors, such as proximity sensors, can also be used to detect the presence of a traffic delineator 11B in the V-shaped receiving structure 42.

A plurality of actuators are used to move the components of the lifting arm assembly 23 and the gripper assembly 28 to perform the functions of retrieving portable traffic delineators 11 from roadways 22 and placing portable traffic delineators 11 onto roadways 22. The actuators can be electric actuators, hydraulic actuators, pneumatic actuators, or a combination thereof.

Figure 19:
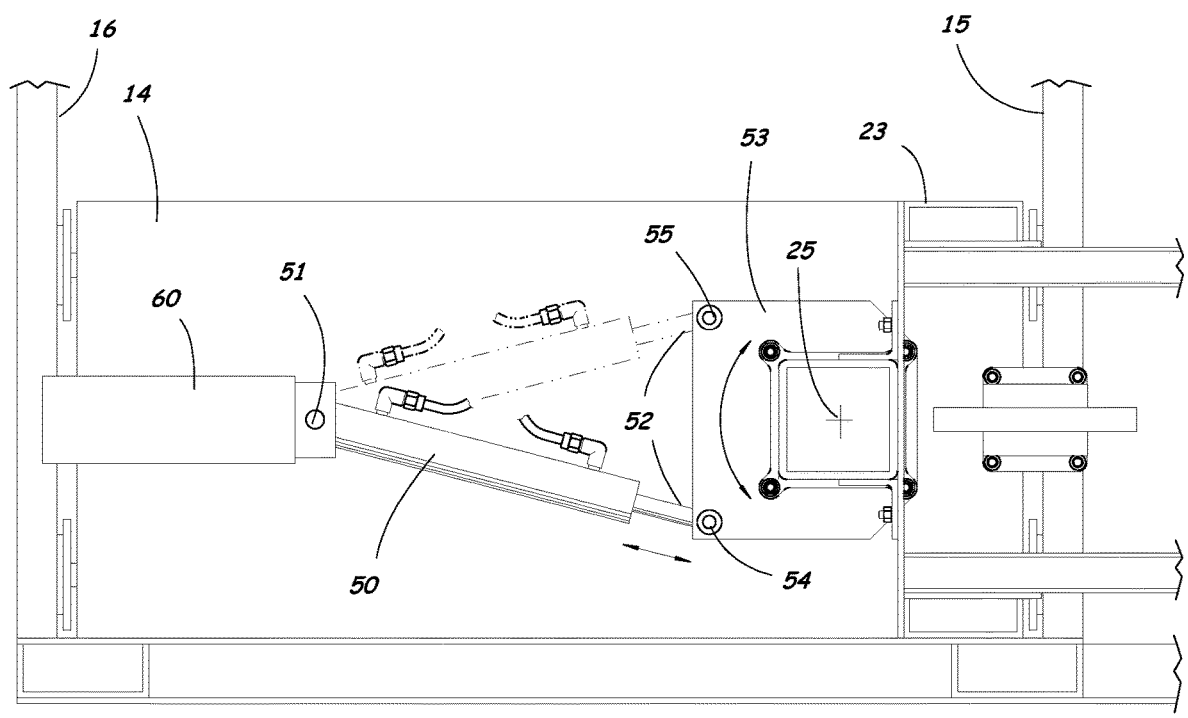
FIG. 19 is a detail plan view of the actuator and mechanism for rotating the lifting arm assembly about the first vertical axis.

A first actuator 50 is arranged to swing the lifting arm assembly 23 about the first vertical axis 25. The first actuator 50 in the illustrated embodiment is a first linear actuator having a first end 51 pivotally attached to the carriage 14, and a second end 52 pivotally connected to a bracket 53 on the lifting arm assembly 23. As shown in detail in FIG. 19, the bracket 53 has first and second connection points 54, 55 to accommodate swinging motion to the right and left sides of the vehicle 13, respectively. When the second end 52 of the first actuator 50 is connected to the first connection point 54, the first actuator 50 can be used to provide 90 degrees of rotational movement of the lifting arm assembly 23 about the first vertical axis 25 between a first position (FIG. 14) with the arm 26 extending rearwardly, and a second position (FIG. 15) with the arm 26 extending to the left side of the vehicle 13. When the second end 52 of the first actuator 50 is connected to the second connection point 55 (as shown in dashed lines in FIG. 19), the first actuator 50 can be used to provide 90 degrees of rotational movement of the lifting arm assembly 23 about the first vertical axis 25 between a first position with the arm 26 extending rearwardly, and a second position with the arm 26 extending to the right side of the vehicle 13.

By selective connection of the first actuator 50 to either the first or second connection points 54, 55, the lifting arm assembly 23 is movable between a position in which the arm 26 extends from the right side of the vehicle 13, a position in which the arm 26 extends in a rearwardly direction to receive and discharge portable traffic delineators on the cargo platform 21 of the vehicle 13, and a position in which the arm 26 extends from the left side of the vehicle 13.

A breakaway structure 60 can be provided with the first actuator 50 to allow the lifting arm assembly 23 to rotate about the first vertical axis 25 when encountering an obstruction, such as contact with a fixed object or the roadway itself. The breakaway structure 60 will help prevent major damage to the lifting arm assembly 23 or other structural components of the apparatus 10 upon impact with such an obstruction. The breakaway structure 60 can be reset easily by pivoting the lifting arm assembly 23 back to its original position after the obstruction has passed. The breakaway structure 60 can be, for example, a roller biased into engagement with a detent by a spring, or the breakaway structure 60 can be a spring-cushioned mounting system for connecting the first end 51 of the actuator 50 to the carriage 14.

The vertical movement mechanism 27 includes a second actuator 61 and a chain and sprocket assembly 62. The chain and sprocket assembly 62 has a chain 63 with a first end 64 connected to a vertically stationary part of the lifting arm assembly 23, a second end 65 connected to a vertically moveable part of the lifting arm assembly 23, and a sprocket 66 mounted to the upper end of the second actuator 61. The chain and sprocket assembly 62 is provided as a distance multiplier to increase the magnitude of vertical motion imparted to the lifting arm assembly 23 for a given stroke length of the second actuator 61. The chain and sprocket assembly 62 is arranged to move the arm 26 vertically relative to the carriage 14 upon extension and retraction of the second actuator 61. The second actuator 61 in the illustrated embodiment is a second linear actuator.

A third actuator 70 is arranged to move the gripper assembly 28 relative to the arm 26 about the second vertical axis 29. The third actuator 70 includes a third linear actuator having a first end 71 connected to the arm 26, and a second end 72 connected to a first rotatable gear 73. The first rotatable gear 73 meshes with a second rotatable gear 74 on the gripper assembly 28. The second rotatable gear 74 on the gripper assembly 28 has a smaller diameter than the first rotatable gear 73, so that rotational movement of the first rotatable gear 73 by extension or retraction of the third actuator 70 causes a greater rotational movement of the second rotatable gear 74. For example, if the diameter of the first rotatable gear 73 is twice the diameter of the second rotatable gear 74, the second rotatable gear 74 and gripper assembly 28 will rotate through a range of 180 degrees upon rotation of the first rotatable gear 73 through a range of 90 degrees.

The gripper assembly 28 is rotatable about the second vertical axis 29 through a range of 180 degrees to allow the gripper assembly 28 to be movable between a first position in which the V-shaped receiving structure 42 faces left of the arm 26, a second position in which the V-shaped receiving structure 42 faces directly away from the arm 26, and a third position in which the V-shaped receiving structure 42 faces right of the arm 26.

The combined movement of the lifting arm assembly 23 about the first vertical axis 25 and the gripper assembly 28 about the second vertical axis 29 allows the gripper assembly 28 to be rotated 360 degrees relative to the carriage 14.

Additional actuators 34A, 48, referred to herein as fourth actuators, are used in the gripper assembly 28 to selectively move the suction cups 34, 43, 44 into and out of engagement with the traffic delineator 11 received in the V-shaped receiving structure 32, 42. The fourth actuators 34A, 48 in the illustrated embodiments include respective linear actuators connected in parallel and positioned on the right and left sides of the gripper assembly 28 for simultaneously controlling movement of the suction cups 34, 43, 44 into and out of the V-shaped receiving structure 32, 42.

In the illustrated embodiment, the fourth actuators 34A, 48 are single acting pneumatic actuators with spring returns. Using pneumatic pressure to actuate the fourth actuators 34A, 48, instead of hydraulic pressure, allows the fourth actuators 34A, 48 to be operated with low pressures so that the suction cups 34, 43, 44 can be moved into gentle engagement with the traffic delineators 11 with little or no distortion of the sidewalls of the traffic delineators 11. Typical cone and barrel-shaped traffic delineators 11 are made of thin plastic material with sidewalls that are easily distorted. The suction cups 34, 43, 44 will seal better against the outer surface of such traffic delineators 11 if the sidewalls of the traffic delineators 11 are not distorted by the suction cups 34, 43, 44 during operation.

A self-contained power module 80 and controller 81 are provided on the lift arm assembly 23. The power module 80 and controller 81 are positioned on the opposite side of the support tower 24 from the lifting arm 26 to counterbalance the weight of the arm 26 during operation. The power module 80 may include a rechargeable battery and electrical system for operating electric actuators and for powering the controller 81. The power module 80 may also include a hydraulic and/or a pneumatic pump 82 for providing a pressure source for operating hydraulic or pneumatic actuators. The power module includes the vacuum pump 35 for supplying a source of vacuum to the suction cups 34, 43, 44. The power module 80 may include other power sources, such as an internal combustion engine for generating the power needed for operation or for recharging the battery. The power module 80 can also be equipped to receive power from external sources, such as the electrical system of the vehicle 13 used to transport the apparatus 10.

The controller 81 is used to automatically control the movement of the lifting arm assembly 23 and the gripper arm assembly 28 during operation. The controller 81 includes a microprocessor and is programmable to perform a first sequence of steps to operate the gripper assembly 28 to retrieve portable traffic delineators 11 from a roadway. The controller 81 is also programmable to perform a second sequence of steps to operate the gripper assembly 28 to place portable traffic delineators 11 on a roadway. The first and second sequence of steps can be automatically started by the controller 81 upon receiving a signal from the switch 39, 47 indicating a portable traffic delineator 11 is located within the V-shaped receiving structure 32, 42 of the gripper assembly 28.

The first sequence of steps to retrieve portable traffic delineators 11 from a roadway includes moving the suction cups 34, 43, 44 into contact with a portable traffic delineator 11 detected within the V-shaped receiving structure 32, 42, applying suction to the suction cups 34, 43, 44 from a vacuum source, raising the arm 26 and gripper assembly 28 relative to the storage platform 21 of the vehicle to lift the portable traffic delineator 11 from the roadway, rotating the gripper assembly 28 relative to the arm 26 and rotating the support tower assembly 24 relative to the carriage 14 to place the gripper assembly 28 over the cargo platform 21 of the vehicle 13, and releasing the suction and moving the suction cups 34, 43, 44 to release the portable traffic delineator 11 from the gripper assembly 28 onto the cargo platform 21.

The second sequence of steps to place portable traffic delineators 11 on a roadway 22 includes moving the suction cups 34, 43, 44 into contact with a portable traffic delineator 11 detected within the V-shaped receiving structure 32, 42, applying suction to the suction cups 34, 43, 44, raising the lifting arm assembly 23 and gripper assembly 28 relative to the cargo platform 21 of the vehicle 13, rotating the gripper assembly 28 relative to the arm 26 and rotating the lifting arm assembly 23 relative to the carriage 14 to selectively place the gripper assembly 28 over either a right or left side of the vehicle 13 with the V-shaped receiving structure 32, 43 facing rearwardly, lowering the arm 26 relative to the cargo platform 21, and releasing the suction and moving the suction cups 34, 43, 44 to release the traffic delineator 11 from the gripper assembly 28 onto the roadway 22.

The apparatus 10 for handling portable traffic delineators 11 according to the present invention is described above. A method for handling traffic delineators 11 using the apparatus 10 will now be described with reference to the flowchart shown in FIG. 20.

As explained above, the controller 81 includes a microprocessor and is programmable to perform a first sequence of steps for a retrieval mode and a second sequence of steps for a placement mode. The user can select between the retrieval mode and the placement mode when initiating operation of the apparatus 10.

Figure 20:
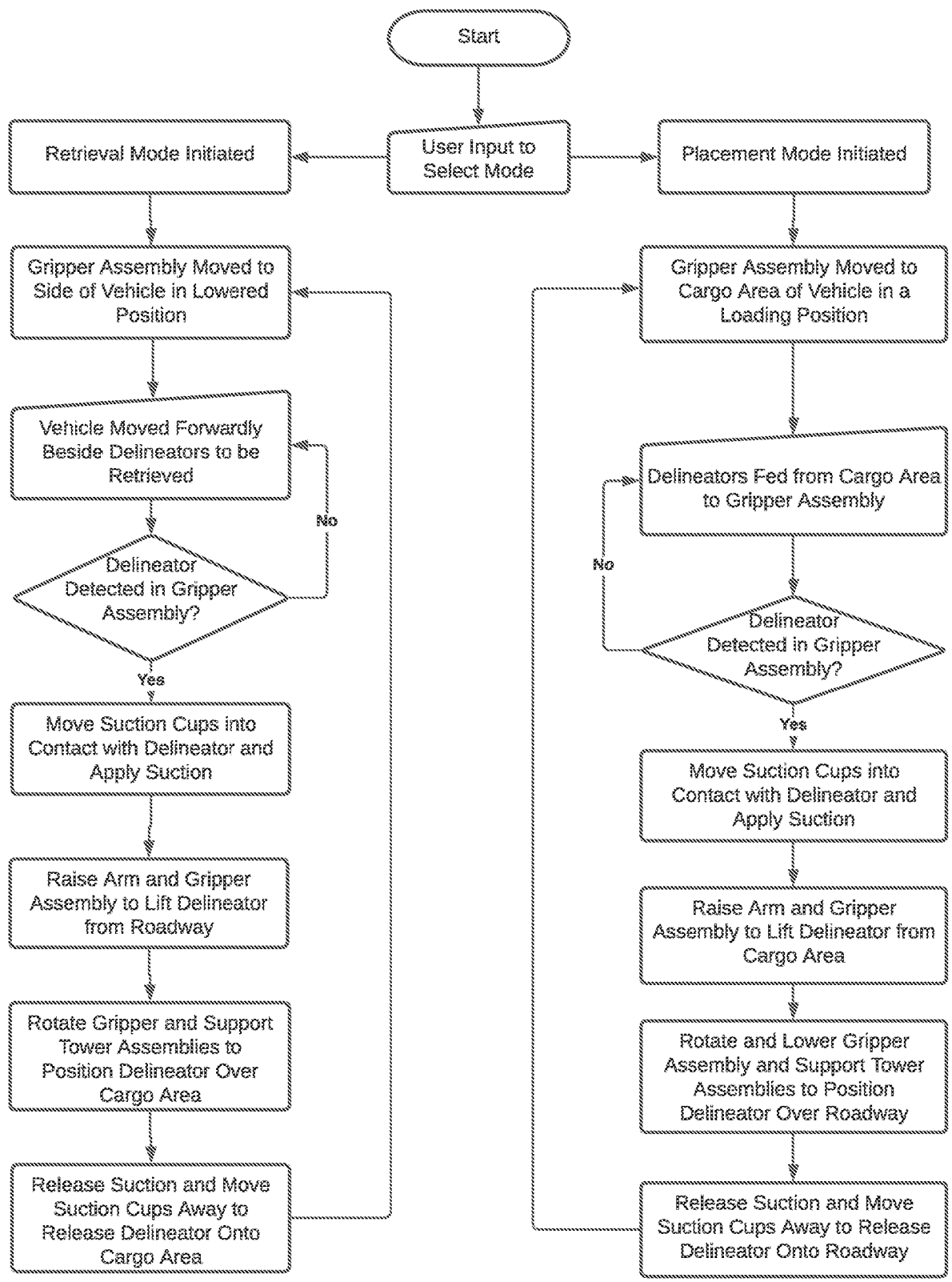
FIG. 20 is a flowchart showing a first sequence of steps performed by the apparatus in a delineator retrieval mode, and a second sequence of steps performed by the apparatus in a delineator placement mode.

When the retrieval mode is selected, the controller 81 will perform the first sequence of steps to operate the gripper assembly 28 to retrieve portable traffic delineators 11 from a roadway, as shown on the left side of the flowchart in FIG. 20. The controller 81 starts the retrieval mode by positioning the lifting arm assembly 23 and gripper assembly 28 on a selected side of the vehicle 13 in a lowered position with the V-shaped receiving structure 32, 42 facing forward. The vehicle 13 is then moved forwardly beside a series of spaced apart traffic delineators 11 so that traffic delineators 11 to be retrieved are in the path of movement of the V-shaped receiving structure 32, 42. When a traffic delineator 11 is detected within the V-shaped receiving structure 32, 42 by the switch or sensor 39, 47, a signal is sent to a valve that energizes the fourth pneumatic actuators 34A, 48 to move the suction cups 34, 43, 44 into contact with the traffic delineator 11, and to a valve that opens a vacuum flow to the suction cups 34, 43, 44. A signal is also sent to the controller 81, which controls the various actuators 50, 61, 70 for the lifting arm assembly 23 and gripper assembly 28 to retrieve the portable traffic delineator 11 from the roadway 22 and place it over the cargo platform 21 of the vehicle 13. The vacuum flow to the suction cups 34, 43, 44 is then released, and the fourth actuators 34A, 48 are released to move the suction cups 34, 43, 44 away from the delineator 11 to release the delineator onto the cargo platform 21. The controller 81 will then control the actuators 50, 61, 70 to return the lifting arm assembly 23 and gripper assembly 28 to the starting position for receiving another traffic delineator 11 from the roadway 22. The first sequence of steps can be automatically repeated until all of the traffic delineators 11 have been retrieved or the cargo 21 area of the vehicle 13 becomes full.

When the placement mode is selected, the controller 81 will perform the second sequence of steps to operate the gripper assembly 28 to place portable traffic delineators 11 onto the roadway 22, as shown on the right side of the flowchart in FIG. 20. The controller 81 starts the placement mode by positioning the lifting arm assembly 23 and gripper assembly 28 in a loading position with the V-shaped receiving structure 32, 42 facing the cargo area 21 of the vehicle 13. The traffic delineators 11 are then fed one-at-a-time into the V-shaped receiving structure 32, 42 by a worker located on the vehicle 13, or by an automatic loading system (not shown) contained on the vehicle 13. When a traffic delineator 11 is detected within the V-shaped receiving structure 32, 42 by the switch or sensor 39, 47, a signal is sent to a valve that energizes the fourth pneumatic actuators 34A, 48 to move the suction cups 34, 43, 44 into contact with the traffic delineator 11, and to a valve that opens a vacuum flow to the suction cups 34, 43, 44. A signal is also sent to the controller 81, which controls the various actuators 50, 61, 70 for the lifting arm assembly 23 and gripper assembly 28 to move the traffic delineator 11 from the cargo platform 21 on the vehicle 13 to the target position on a roadway 22. The vacuum flow to the suction cups 34, 43, 44 is then released, and the fourth actuators 34A, 48 are released to move the suction cups 34, 43, 44 away from the delineator 11 to release the delineator onto the roadway 22. The controller 81 will then return the lifting arm assembly 23 and gripper assembly 28 to the starting position for receiving another traffic delineator 11 from the cargo area 21 of the vehicle 13. The second sequence of steps can be automatically repeated until all of the traffic delineators 11 for a given traffic control situation have been placed, or until the cargo area 21 of the vehicle 13 becomes empty.

The controller 81 can also be equipped with a distance measuring system or GPS to geo reference the position of the apparatus 10 during operation and to control the release of the traffic delineators 11 from the gripper assembly 28 based on the position of the apparatus 10. The controlled release of the traffic delineators 11 from the gripper assembly 28 allows the traffic delineators 11 to be placed at the desired spacing along the roadway 22 for a particular traffic control situation.

While the invention has been described in connection with specific embodiments thereof, it is to be understood that this is by way of illustration and not of limitation, and the scope of the appended claims should be construed as broadly as the prior art will permit.

What is claimed is:

1. An apparatus for handling portable traffic delineators, comprising:
    a frame adapted to be secured to a vehicle;
    a carriage mounted to said frame, said carriage being movable from one side of said frame to another side of said frame to configure the apparatus for right side or left side operation relative to the vehicle on which the frame is secured;
    a lifting arm assembly having a support tower connected to said carriage for rotation about a first vertical axis relative to said carriage, said lifting arm assembly further comprising an arm connected to said support tower for movement vertically relative to said carriage; and
    a gripper assembly pivotally mounted to said arm for rotation about a second vertical axis, said gripper assembly comprising guide rails that define a V-shaped receiving structure for receiving portable traffic delineators, at least one suction cup arranged for pivoting into and out of engagement with an outer surface of a portable traffic delineator received in said V-shaped receiving structure, said suction cup being connected to a vacuum source for applying a suction force to the outer surface of the portable traffic delineator received in said V-shaped receiving structure, and a switch arranged to detect a presence of a portable traffic delineator within said V-shaped receiving structure;
    further comprising a first actuator arranged to move said lifting arm assembly about said first vertical axis, said first actuator comprising a first linear actuator;
    wherein said lifting arm assembly comprises a vertical movement mechanism arranged to move said arm vertically relative to said carriage;
    wherein said vertical movement mechanism comprises a second actuator and a chain and sprocket assembly arranged to move said arm vertically relative to said carriage upon extension and retraction of said second actuator, said second actuator comprising a second linear actuator;
    further comprising a third actuator arranged to move said gripper assembly about said second vertical axis, said third actuator comprising a third linear actuator;
    wherein said gripper assembly comprises a fourth actuator arranged to selectively move said at least one suction cup into and out of engagement with a portable traffic delineator received in said V-shaped receiving structure, said fourth actuator comprising a fourth linear actuator.

2. The apparatus according to claim 1, wherein said at least one suction cup comprises a first pair of suction cups arranged to engage and apply a suction force to an outer surface of a portable traffic delineator received in said V-shaped receiving structure.

3. The apparatus according to claim 2, wherein said first pair of suction cups are arranged on opposing sides of said tapered opening, and said fourth actuator comprises a pair of pneumatic linear actuators arranged to selectively move said first pair of suction cups into and out of engagement with a portable traffic delineator received in said V-shaped receiving structure.

4. The apparatus according to claim 3, wherein said lifting arm assembly is rotatable about said first vertical axis through a range of 180 degrees to allow said arm to be movable between a first position in which the arm extends from the right side of the vehicle, a second position in which the arm extends in a rearwardly direction to receive and discharge portable traffic delineators on the storage platform of the vehicle, and a third position in which the arm extends from the left side of the vehicle.

5. The apparatus according to claim 4, wherein said gripper assembly is rotatable about said second vertical axis through a range of 180 degrees to allow said gripper assembly to be movable between a first position in which the tapered opening faces left of said arm, a second position in which the tapered opening faces directly away from said arm, and a third position in which the tapered opening faces right of said arm.

6. The apparatus according to claim 5, wherein the combined movement of said lifting arm assembly about said first vertical axis and said gripper assembly about said second vertical axis allows said gripper assembly to be rotated 360 degrees relative to said carriage.

7. The apparatus according to claim 1, further comprising a pair of rollers arranged at an intermediate location along said guide rails to facilitate guiding and centering a portable traffic delineator within said V-shaped receiving structure.

8. The apparatus according to claim 1, further comprising at least one padded friction element arranged within said V-shaped receiving structure for engaging a portable traffic delineator received in said V-shaped receiving structure.

9. The apparatus according to claim 1, wherein said switch is a contact switch arranged to extend into said V-shaped receiving structure for engagement with a portable traffic delineator received in said V-shaped receiving structure.

10. The apparatus according to claim 9, wherein said contact switch comprises a rolling contact element arranged to be engaged by a portable traffic delineator received in said V-shaped receiving structure.

11. The apparatus according to claim 1, further comprising a controller programmed with a first sequence of steps to operate said gripper assembly to retrieve portable traffic delineators from a roadway by moving said at least one suction cup into contact with a portable traffic delineator detected within said V-shaped receiving structure, applying suction to said at least one suction cup from the vacuum source, raising said arm and said gripper assembly relative to said storage platform of the vehicle to lift the portable traffic delineator from the roadway, rotating said gripper assembly relative to said arm and rotating said support tower assembly relative to said carriage to place said gripper assembly over a cargo platform of the vehicle, and releasing the suction and moving the suction cups to release the portable traffic delineator from the gripper assembly onto the cargo platform.

12. The apparatus according to claim 11, wherein said controller is further programmed with a second sequence of steps to operate said gripper assembly to place portable traffic delineators on a roadway by moving said suction cups into contact with a portable traffic delineator detected within said V-shaped receiving structure, applying suction to said suction cups, raising said lifting arm assembly and said gripper assembly relative to said cargo platform of the vehicle, rotating said gripper assembly relative to said arm and rotating said lifting arm assembly relative to said carriage to selectively place said gripper assembly over either a right or left side of the vehicle with the V-shaped receiving structure facing rearwardly, lowering said arm relative to said cargo platform, and releasing the suction and moving the suction cups to release the portable traffic delineator from the gripper assembly onto the roadway.

13. The apparatus according to claim 12, wherein said controller is programmed to automatically start said first or second sequence of steps upon receiving a signal from said switch detecting a portable traffic delineator within said V-shaped receiving structure.

* * * * *